(12) United States Patent
Parento et al.

(10) Patent No.: US 10,290,061 B2
(45) Date of Patent: *May 14, 2019

(54) PAYROLL SYSTEM WITH FLEXIBLE DISBURSEMENT OPTIONS

(71) Applicant: MasterCard International Incorporated, Purchase, NY (US)

(72) Inventors: Stephen A. Parento, White Plains, NY (US); Ronald Carl Hynes, Ridgefield, CT (US); Shekhar Sahgal, Stamford, CT (US)

(73) Assignee: Mastercard International Incorporated, Purchase, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/439,254

(22) Filed: Feb. 22, 2017

(65) Prior Publication Data

US 2017/0161845 A1 Jun. 8, 2017

Related U.S. Application Data

(63) Continuation of application No. 14/461,113, filed on Aug. 15, 2014, now Pat. No. 9,613,381.

(51) Int. Cl.
*G06Q 10/00* (2012.01)
*G06Q 40/00* (2012.01)
*G06Q 20/10* (2012.01)
*G06Q 20/08* (2012.01)

(52) U.S. Cl.
CPC ....... *G06Q 40/125* (2013.12); *G06Q 20/0855* (2013.01); *G06Q 20/10* (2013.01)

(58) Field of Classification Search
CPC .............................. G06Q 40/125; G06Q 20/10

USPC ........................................................... 705/28
See application file for complete search history.

(56) References Cited

U.S. PATENT DOCUMENTS

| | | | |
|---|---|---|---|
| 7,761,370 B1* | 7/2010 | Hicks | G06Q 20/26 705/38 |
| 7,941,351 B1 | 5/2011 | Rosenfeld et al. | |
| 2002/0184148 A1 | 12/2002 | Kahn et al. | |
| 2007/0203835 A1* | 8/2007 | Cai | G06Q 20/1085 705/43 |

OTHER PUBLICATIONS

"Examination Report No. 1 for standard patent application", Australian Government IP Australia, dated Sep. 19, 2017, for Australian Application No. 2015302225, 3pgs.

(Continued)

*Primary Examiner* — Rokib Masud
(74) *Attorney, Agent, or Firm* — Buckley, Maschoff & Talwalkar LLC

(57) ABSTRACT

A method includes storing payroll information for an employee of an employer. The payroll information may include the employee's name, address, electronic contact information, etc. A payroll service computer may receive an indication from an employer that the computer is to make a payroll disbursement to the employee. The computer may present disbursement options to the employee. The employee may select one of the disbursement options. The computer may initiate the payroll disbursement in accordance with the option selected by the employee.

1 Claim, 12 Drawing Sheets

(56) References Cited

OTHER PUBLICATIONS

Communication: "Supplemental European Search Report" dated Dec. 8, 2017 (Dec. 8, 2017), European Patent Office, for European Application No. 15832375.8-1871, 6pgs.
"Examination Report No. 2 for standard patent application", Australian Government IP Australia, dated Nov. 24, 2017, for Australian Application No. 2015302225, 4pgs.
"Singapore Written Opinion", IPOS Intellectual Property Office of Singapore, dated Jun. 15, 2017, for Singapore Application No. 11201701108Q, 4pgs.
"Canadian Examination Report", Innovation, Science and Economic Development Canada, Canadian Intellectual Property Office, dated Dec. 29, 2017 (dated Dec. 29, 2017), for Canadian Application No. 2,958,205, 4pgs.

* cited by examiner

# PAYROLL SYSTEM WITH FLEXIBLE DISBURSEMENT OPTIONS

CROSS-REFERENCE TO RELATED APPLICATION

This application claims priority to U.S. patent application Ser. No. 14/461,113 filed on Aug. 15, 2014, which is incorporated in its entirety herein by reference.

BACKGROUND

Disbursing wages or salaries to employees is often viewed as administratively burdensome to employers. Many employers seek to reduce the administrative inconvenience and expense relating to payroll disbursement and accounting by relying on payroll service providers. However, even with the help of a payroll service company, employers often find that providing the necessary information for each payday to the service provider is an inconvenient process, and often one that requires hiring of one or more part or full-time administrative personnel. Particularly for small employers, it would be highly desirable to minimize the amount of effort required to provide payment of wages and/or salaries, while allowing for maximum convenience and flexibility to the employees who are to be paid.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, an employer may interact with an application on a mobile device to report to the employer's payroll service provider the key data required to calculate a payroll disbursement for one of the employer's employees for a current payroll period. The payroll service provider, acting through its central computer, may proceed with the calculation, and then send a message (e.g., an e-mail message or mobile device text message) to the employee. The message may inform the employee that his/her payroll disbursement is available. The message may also set forth various options available for the employee by which the employee may receive the disbursement. The options may include, for example, the employee's payment card account, demand deposit bank account, sending a paper check by mail to the employee, etc. The payroll service computer may receive from the employee an indication as to which option the employee has selected, and then may proceed to make the payroll disbursement in accordance with the option that was selected by the employee.

After initial set-up, this arrangement may be highly convenient for both the employer and the employee, and may provide a high degree of flexibility for the employee, while often piggybacking on the highly efficient funds transfer capabilities of a conventional payment card account based payment system.

Figure 1:
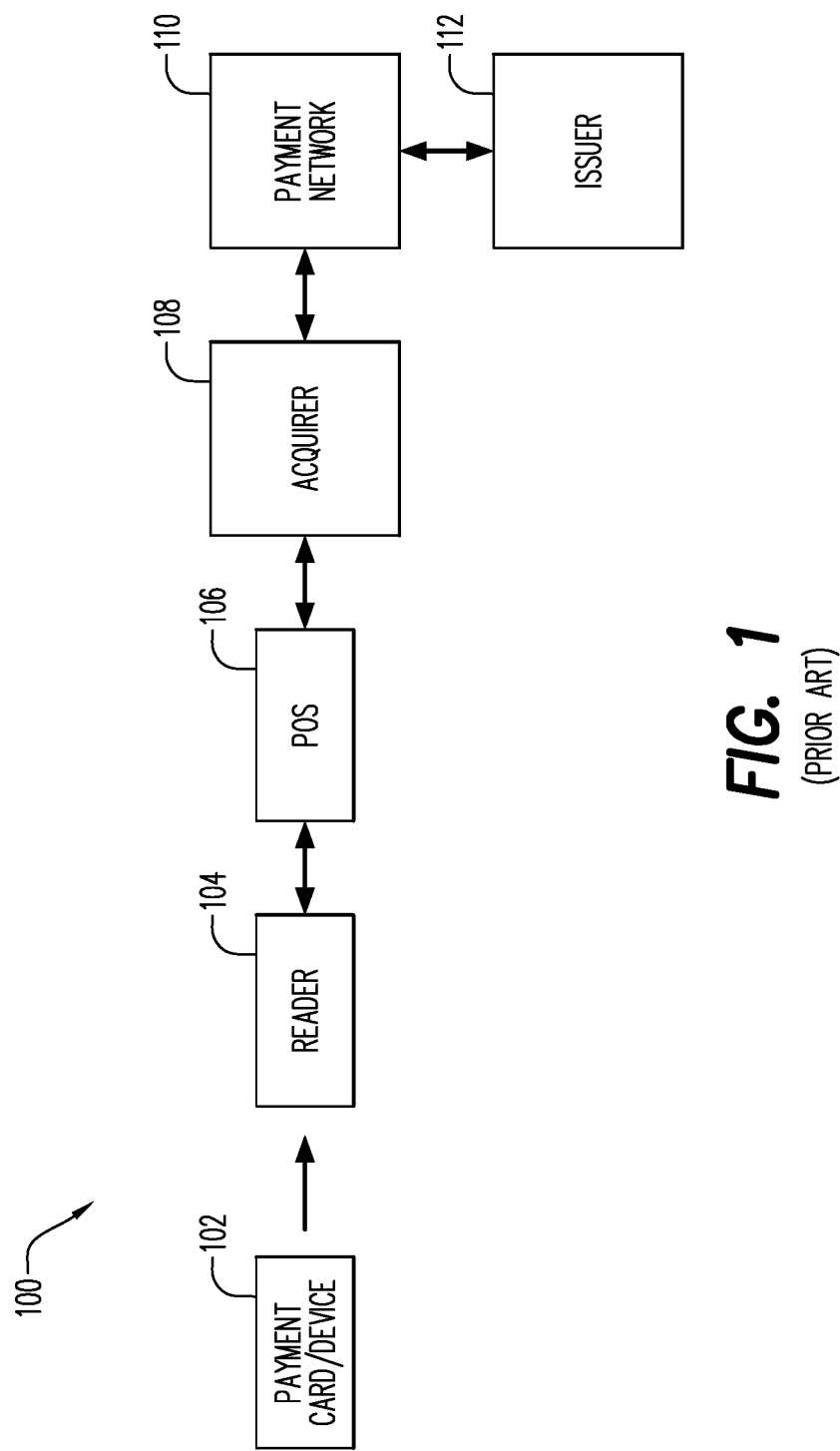
FIG. 1 is a block diagram of a conventional payment system used for purchase transactions.

By way of background, and because the invention may make use of a conventional payment card account based payment system, such a system will first be briefly described. FIG. 1 is a block diagram that illustrates a conventional payment system 100.

The system 100 includes a conventional payment card/device 102. As is familiar to those who are skilled in the art, the payment card/device 102 may be a magnetic stripe card, an IC (integrated circuit) card, a fob, a payment-enabled smartphone, etc.

The system 100 further includes a reader component 104 associated with a POS (point of sale) terminal 106. In some known manner (depending on the type of the payment card/device 102) the reader component 104 is capable of reading the payment card account number and other information from the payment card/device 102.

The reader component 104 and the POS terminal 106 may be located at the premises of a retail store and operated by a sales associate of the retailer (merchant) for the purpose of processing retail transactions. The payment card/device 102 is shown in FIG. 1 to be interacting with the reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment card account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment card issuer server computer 112 may be operated by or on behalf of a financial institution ("FI") that issues payment card accounts to individual users. For example, the payment card issuer server computer 112 may perform such functions as (a) receiving and responding to requests for authorization of payment card account transactions to be charged to payment card accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment card issuers and their computers, a considerable number of acquirers and their computers, and numerous merchants and their POS terminals and associated proximity reader components. The system may also include a very large number of payment card account holders, who carry payment cards or other devices for initiating payment transactions by presenting an associated payment card account number to the reader component of a POS terminal.

Figure 2:
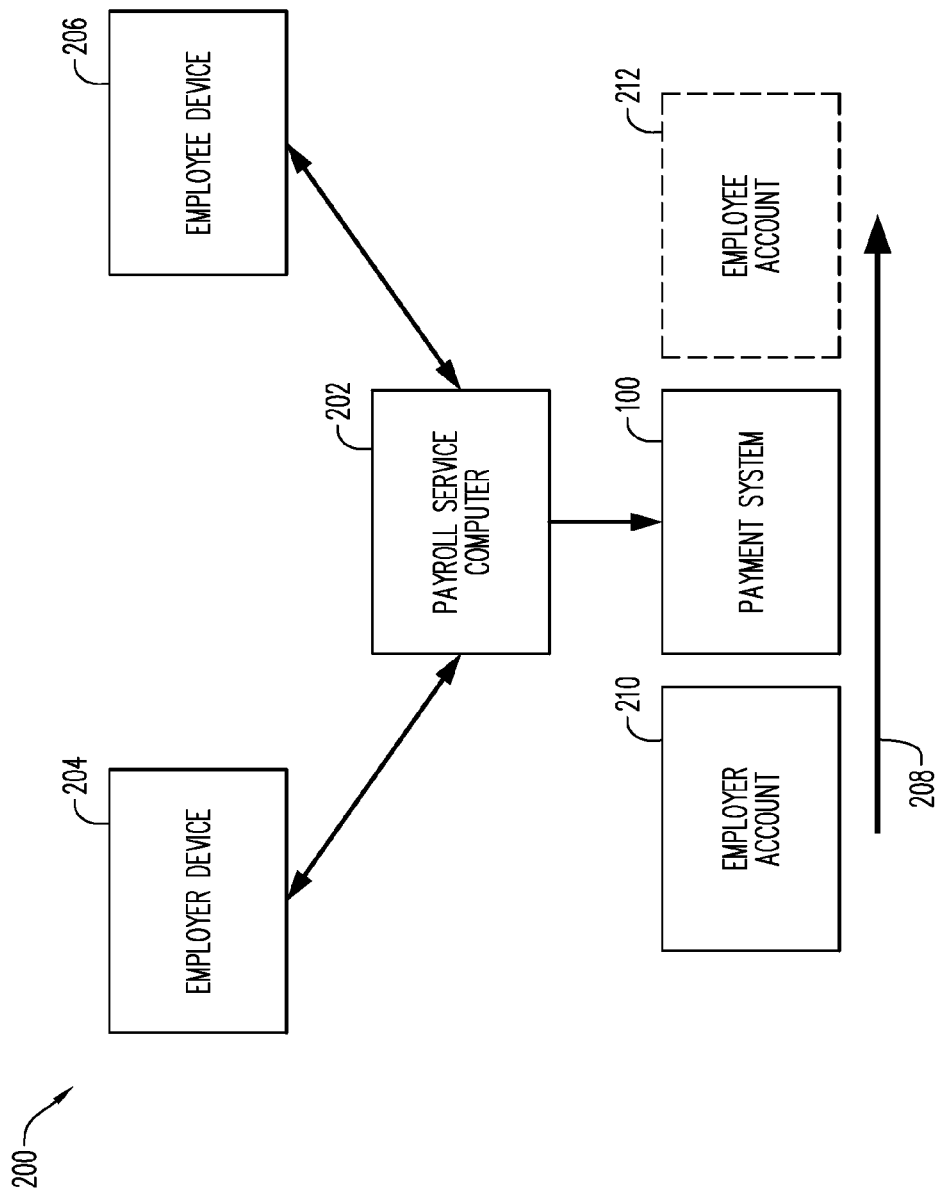
FIG. 2 is a high level block diagram representation of a payroll disbursement system provided in accordance with aspects of the present invention.

FIG. 2 is a high level block diagram representation of a payroll disbursement system 200 provided in accordance with aspects of the present invention.

A payroll service computer 202 may perform a central role in the payroll disbursement system 200. The payroll service computer 202 may be operated by a payroll services company, and will be further described below in connection with FIGS. 3-5, 7 and 8. In some embodiments, the payroll service computer 202 may alternatively be operated by the operator of a payment network such as the payment network 110 shown in FIG. 1.

Also shown in FIG. 2 is an employer device 204, which may be in communication with the payroll service computer 202. The employer device 204 may, in its hardware aspects, be a conventional mobile-communication-enabled tablet computer (e.g., an iPad) or a conventional smartphone. The employer device 204 may run a suitable mobile device application to facilitate the payroll-related functionality described herein, and also may run a mobile browser. Via the mobile browser, the employer device 204 may be enabled to engage in data communications "over the air" with the payroll service computer 202. In other embodiments, or in some circumstances, the employer device 204 may alternatively be a generally conventional laptop or personal computer or tablet computer running a browser program by which the employer may interact with a website hosted by the payroll service computer 202.

In addition, an employee device 206 is shown as being part of the payroll disbursement system 200. Like the employer device 204, the employee device 206 may be conventional in its hardware aspects, and may for example be constituted by a conventional tablet computer or smartphone. In other embodiments, or in some circumstances, the employee device 206 may alternatively be a generally conventional laptop or personal computer running a browser program by which the employee may interact with a website hosted by the payroll service computer 202. Examples of the employee device 206 will be further described below in connection with FIGS. 5 and 9.

The payroll service computer 202 may implement payroll disbursements via a conventional payment system 100 (such as that illustrated in FIG. 1). For example, in some embodiments, and/or in some instances, the payroll service computer 202 may cause the payroll disbursement to occur via a funds transfer (represented by arrow mark 208) from the employer's bank account 210 to the employee's bank account 212. For example, the employer's bank account 210 and the employee's bank account 212 may both be payment card accounts, in some cases.

As discussed in U.S. published patent application no. 2009/0090783 (which is commonly assigned herewith), a conventional payment network (such as the above-mentioned Banknet system) may support a type of transaction known as a "payment transaction" in addition to conventional purchase transactions that are initiated by an authorization request from a merchant (as illustrated in FIG. 1). As is known to those who are skilled in the art, in a "payment transaction" funds are transferred via a payment network from one payment card account to another.

Although only one employer device 204 and one employee device 206 are shown in the drawing, in a practical embodiment of the payroll disbursement system 200, many employer devices and employee devices may interact with the payroll service computer 202 from time to time, and indeed a large number of such devices may simultaneously be in communication with the payroll service computer 202. By the same token, the payroll disbursement system 200 may operate to make payroll disbursements from numerous employer accounts. Moreover, numerous employee accounts may receive funds transfers attributable to payroll disbursements facilitated by the payroll disbursement system 200. However, to the extent that the payroll disbursement system 200 serves small employers, it may be the case for a given employer account that payroll disbursements from such account may be made only to a rather small number of employee accounts.

It may also be the case that the payroll service computer 202 is operable with more than one payment network.

Figure 3:
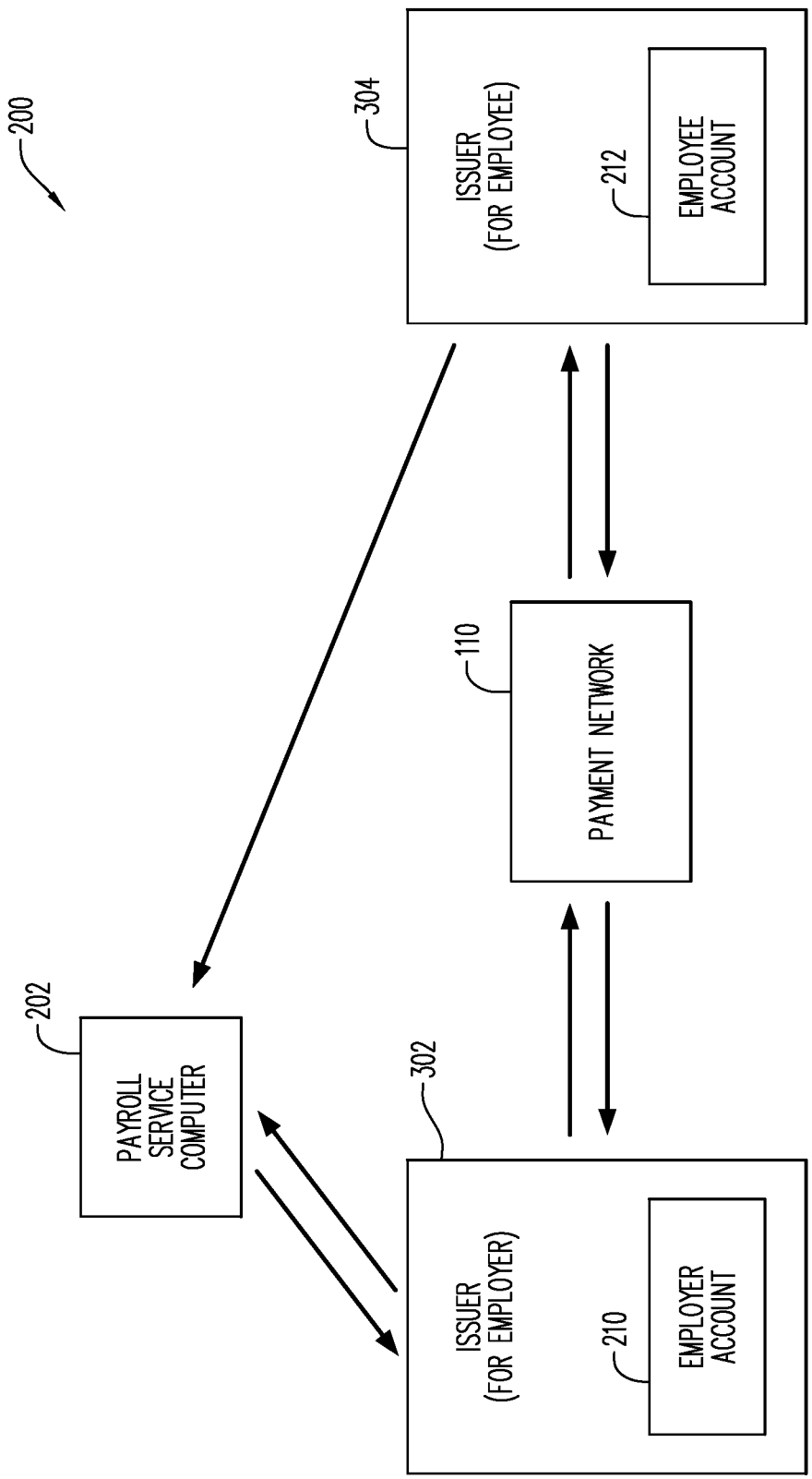
FIG. 3 is a block diagram that shows additional details of the payroll disbursement system of FIG. 2.

FIG. 3 illustrates details of an embodiment of the payroll disbursement system 200 in which payroll disbursement is executed as a payment transaction via payment network 110 from the employer's account 210 (now assumed to be a payment card account) to the employee's account 212 (now also assumed to be a payment card account). Block 302 in FIG. 3 represents the financial institution that is the issuer of the employer's payment card account 210. Block 304 in FIG. 3 represents the financial institution that is the issuer of the employee's payment card account 212. The payroll service computer 202 is also shown in FIG. 3. The payroll service computer 202 may communicate with its originating financial institution (not separately shown) to initiate the payment network payment transaction for the desired payroll disbursement, and may receive confirmation from the employee's account issuer 304 (or from the employer's account issuer 306) that the payment transaction has been completed (and hence the desired payroll disbursement transaction has been completed).

Figure 4:
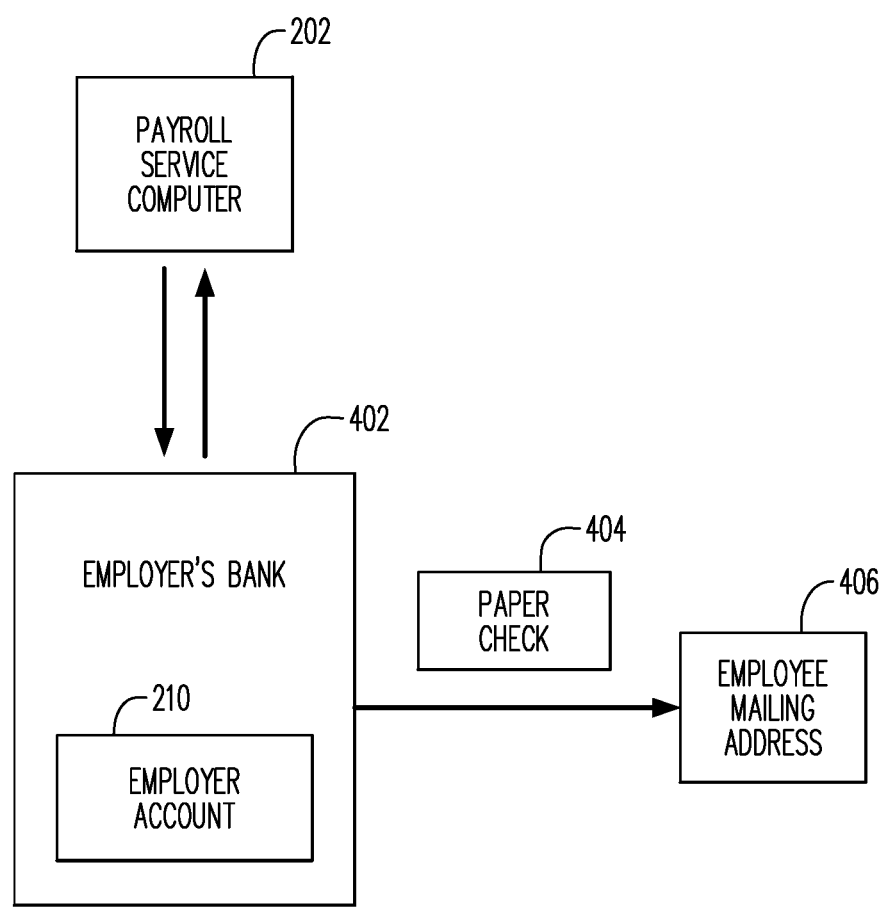
FIG. 4 is a block diagram that shows additional details of the payroll disbursement system of FIG. 2.

FIG. 4 shows other details of an embodiment of the payroll disbursement system 200, in a case where the payroll disbursement is executed by issuing and mailing a paper paycheck to the employee. In this case, the payroll service computer 202 communicates to the payment network 110 (not shown in FIG. 4) which then communicates with the employer's bank 402 (which may, but need not, be the same financial institution as the account issuer 302 shown in FIG. 3), to authorize and pull funds from the employer's payment card account. The payroll service computer 202 then communicates to a check printer (not separately shown) to provide the check details and cause a paper paycheck 404 to be issued by a bank which provides services to the operator of the payroll service computer 202. The paycheck 404 is mailed to the employee's mailing address 406 by the bank that issued the paycheck. Alternatively, the payroll service computer 202 may provide instructions to the employer's bank 402 to issue and mail the check 404 to the employee.

Figure 5:
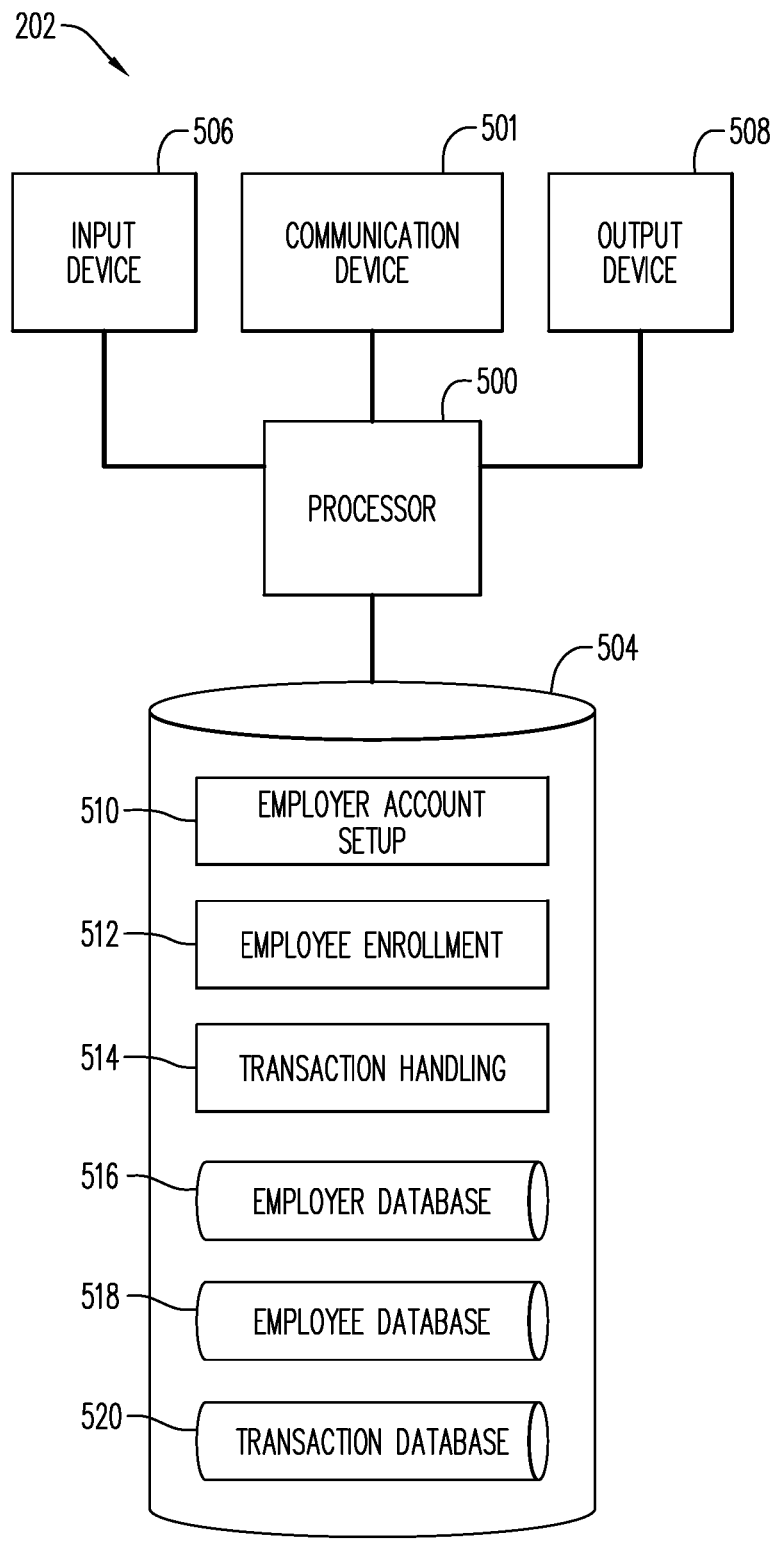
FIG. 5 is a block diagram representation of a computer system that is a component of the payroll disbursement system of FIGS. 2-4.

FIG. 5 is a block diagram that illustrates an embodiment of the payroll service computer 202 (FIGS. 2-4).

The payroll service computer 202 may be conventional in its hardware aspects but may be controlled by software to cause it to function as described herein. For example, the payroll service computer 202 may be constituted by conventional server computer and/or mainframe computer hardware.

The payroll service computer 202 may include a computer processor 500 operatively coupled to a communication device 501, a storage device 504, an input device 506 and an output device 508.

The computer processor 500 may be constituted by one or more conventional processors. Processor 500 operates to execute processor-executable steps, contained in program instructions described below, so as to control the payroll service computer 202 to provide desired functionality.

Communication device 501 may be used to facilitate communication with, for example, other devices (such as employer devices, employee devices and computers operated by financial institutions that are part of one or more payment systems). For example (and continuing to refer to FIG. 5), communication device 501 may comprise numerous communication ports (not separately shown), to allow the payroll service computer 202 to communicate simultaneously with a number of other devices and computers, including communications as required to receive and execute instructions for disbursement of pay to employees of employers served by the payroll service computer 202.

Input device 506 may comprise one or more of any type of peripheral device typically used to input data into a computer. For example, the input device 506 may include a keyboard and a mouse. Output device 508 may comprise, for example, a display and/or a printer.

Storage device 504 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 504 stores one or more programs for controlling processor 500. The programs comprise program instructions (which may be referred to as computer readable program code means) that contain processor-executable process steps of the payroll service computer 202, executed by the processor 500 to cause the payroll service computer 202 to function as described herein.

The programs may include one or more conventional operating systems (not shown) that control the processor 500 so as to manage and coordinate activities and sharing of resources in the payroll service computer 202, and to serve as a host for application programs (described below) that run on the payroll service computer 202.

The programs stored in the storage device 504 may also include an employer account set-up program module 510 that controls the processor 500 to enable the payroll service computer 202 to receive information from employers and to establish accounts for them such that they become enrolled to receive payroll services via the payroll service computer 202. In addition, the storage device 504 may store an employee enrollment program module 512. The employee enrollment program module 512 controls the processor 500 such that the payroll service computer 202 is enabled to receive information from employers for entering information about their employees into the payroll service computer 202.

Another program module that may be stored in the storage device 504 is transaction handling program module 514 that controls the processor 500 to enable the payroll service computer 202 to receive and execute instructions for making payroll disbursements to individual employees for individual pay periods in accordance with information provided by employers and employees. Details of various features of the program modules 510, 512 and 514 will be described below.

The storage device 504 may also store, and the payroll service computer 202 may also execute, other programs, which are not shown. For example, such programs may include a reporting application, which may respond to requests from system administrators for reports on the activities performed by the payroll service computer 202. The other programs may also include, e.g., communication software, one or more database management programs, device drivers, etc.

The storage device 504 may also store one or more databases required for operation of the payroll service computer 202. Such databases may include, for example, a database 516 for storing information about employers who have enrolled for the services provided by the payroll service computer 202. Further, such databases may include a database 518 for storing information entered by the employers concerning their employees who are to be paid via the payroll service computer 202. (The database 518 may also store information entered into the payroll service computer 202 by employees.) In addition, the databases stored in the storage device 504 may include a database 520 for storing information about particular payroll disbursement transactions performed by the payroll service computer 202.

The databases 516, 518 and 520 may be combined and/or linked in a suitable manner to facilitate operation of the payroll service computer 202 as described herein. The storage device 504 may store additional databases, which are not shown, as required for operation of the payroll service computer 202.

Figure 6:
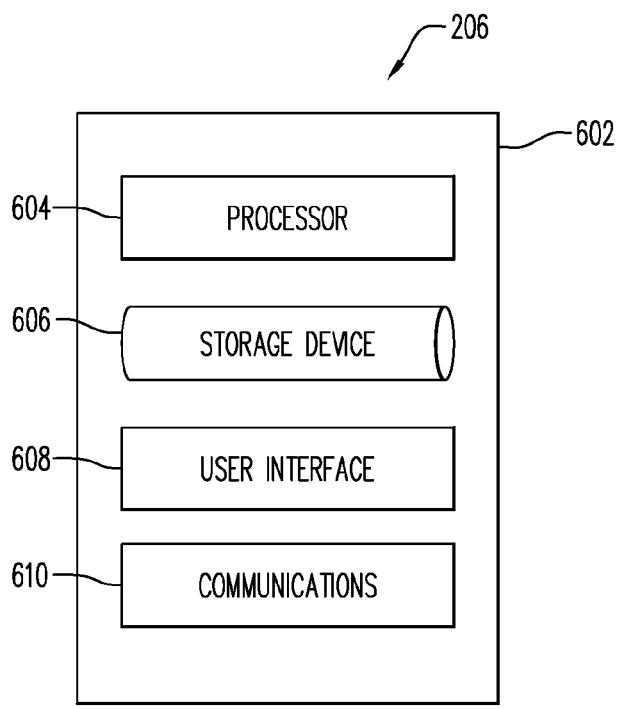
FIG. 6 is a high level block diagram representation of a device that may be used by an employee in connection with the payroll disbursement system of FIGS. 2-4.

FIG. 6 is a simplified, high-level block diagram representation of a typical employee device 206, such as may be used in connection with the payroll disbursement system 200. In its hardware aspects, the employee device 206 may be entirely conventional, and may for example be constituted by a conventional tablet computer (such as the "iPad") or a conventional smartphone (e.g., an "iPhone" or an "Android" device). In some embodiments, the software aspects of the employee device 206 may also be conventional, and may include a mobile browser and conventional capabilities for receiving e-mail and/or text messages. Accordingly, the employee device 206 may, with its conventional functionality, be capable of receiving messages and/or page downloads in such a manner that it can support the payroll-disbursement-related functions that are described herein. In other embodiments, the employee device 206 may run a dedicated mobile application to support use of the employee device 206 in connection with payroll disbursement to the user of the device.

Turning now to FIG. 6, the employee device 206 may include a housing schematically indicated at 602. The housing 602 may contain and/or support other components of the employee device 206.

In addition, the employee device 206 may include a conventional processor 604, which controls the overall operation of the employee device 206. Still further, the employee device 206 may include one or more storage devices 606. The storage device(s) 606 may provide working memory and may also store the operating system, applications and other software that controls the processor 604. The software stored in the storage device(s) 606 may provide functionality as described herein, and may be considered to contain program instructions and/or computer readable program code means and/or processor-executable process steps of the employee device 206 to provide such functionality. The storage device(s) 606 may be in communication with the processor 604.

Another feature of the employee device 206 may be its user interface 608. In many embodiments, as is well known, the chief element of the user interface 608 may be a touchscreen, which is not separately shown. In addition, the employee device 206 may include communication components (represented by block 610), which may allow it to communicate with other devices. For example, the communication components 610 may allow the employee device 206 to communicate via a mobile communication network, which is not shown.

The above description of the hardware aspects of the employee device 206 may be equally applicable to the hardware aspects of the employer device 204. For example, the employer device 204—like the employee device 206—may be constituted by a conventional tablet computer or smartphone. In other embodiments, either or both of the employer device 204 and the employee device 206 may be constituted by a conventional desktop or laptop personal computer. Like the employee device 206, the employer device 204 may be controlled by suitable software/program instructions/computer readable program code means/processor-executable process steps stored in one or more storage devices.

Figure 7:
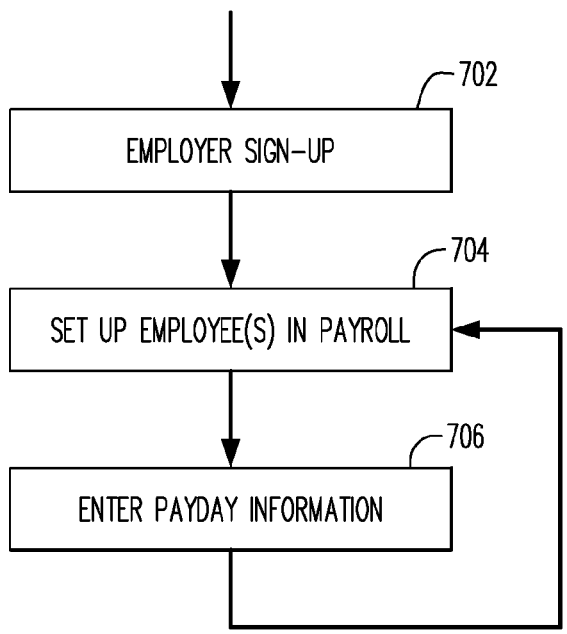
FIG. 7 is a flow chart that illustrates a process that may be performed in accordance with aspects of the present invention.

FIG. 7 is a flow chart that illustrates a process that may be performed in accordance with aspects of the present invention.

At 702 in FIG. 7, the employer may operate the employer device 204 so as to sign up for payroll services via the payroll service computer 202. For example, the employer may use the employer device 204 to log on to a website hosted by the payroll service computer 202. The website may facilitate enrollment of employers for payroll services. In interacting with the website via the employer device 204, the employer may enter information such as his or her name and/or the name of his/her business, his/her taxpayer identification number, and banking information such as a business credit card account number the identifies a credit card account from which payroll disbursements are to be made. In addition or alternatively, the employer may identify a demand deposit account, such as a business checking account, from which payroll disbursements are to be made.

In some embodiments, the employer may also enter information necessary to make payroll calculations. This information may include information that defines the timing of the payroll cycle or cycles for the employer, and the employer's payroll withholding practices, such as standard withholding amounts for employees who participate in one or more employer-sponsored health insurance and/or retirement plans. It will be appreciated that the information submitted may consist in some respects of standard categories of participation, which the employer will later need to specify for each employee in a later stage of the process.

Figure 7A:
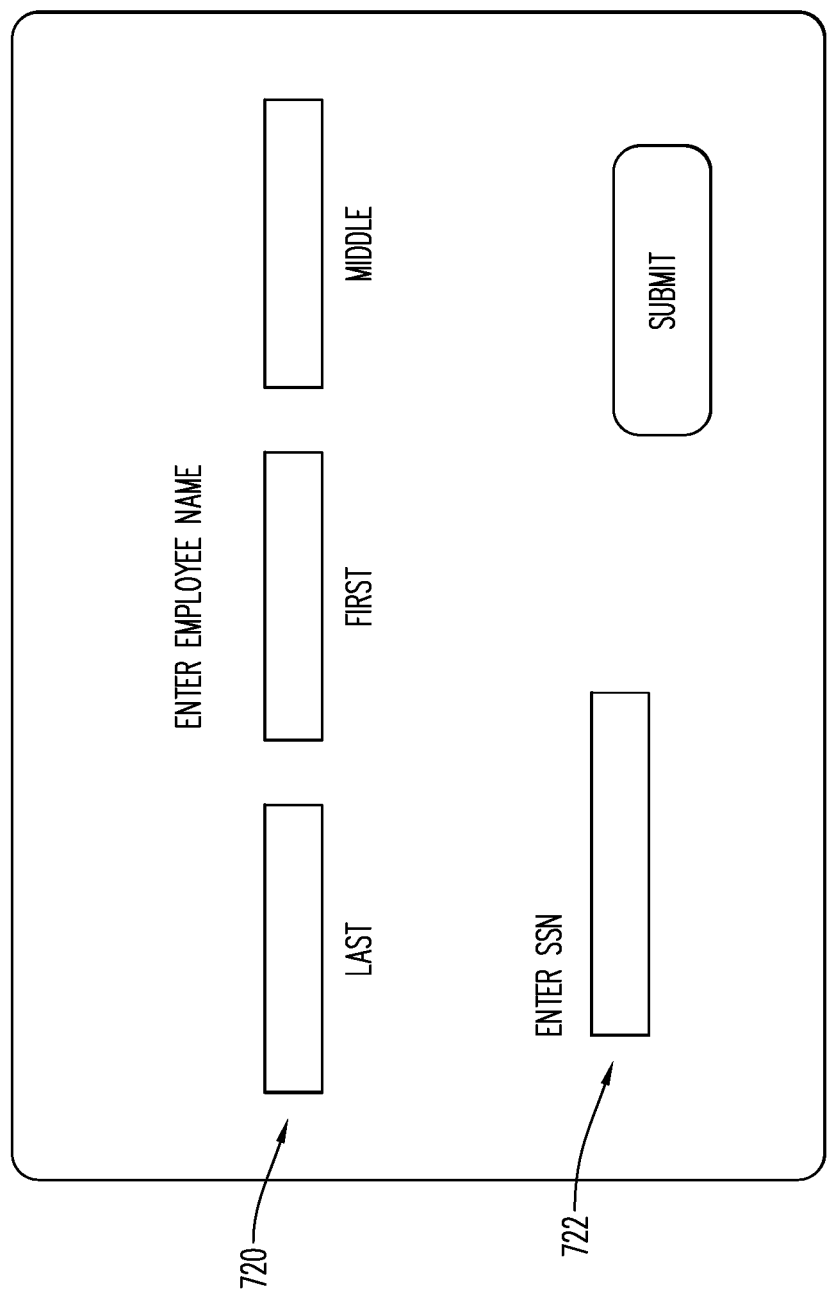
FIGS. 7A-7C are screen displays that may be presented in the system of FIGS. 2-4 in accordance with aspects of the present invention.

At 704 in FIG. 7, the employer may operate the employer device so as to enroll his/her employees who are to be paid via the payroll service computer 202. FIG. 7A shows one example data entry screen display that may be served from the payroll service computer 202 to the employer device 204 to aid the employer in enrolling an employee with the payroll service computer 202. For example, data entry fields 720 in FIG. 7A may enable the employer to enter the employee's name, and data entry field 722 may enable the employer to enter the employee's Social Security number.

It will be appreciated that the screen display may be one of a sequence of such displays presented to the employer via the employer device 204 to facilitate entry of all necessary information to enroll the employee for payroll disbursement via the payroll service computer 202. For example, other screen displays, which are not shown, may permit entry of the employee's home address, the employee's salary or hourly pay rate, an indication of what pay cycle applies to the employee, and information concerning deductions and/or withholdings to be made from the employee's pay. Still further, the employer may enter electronic contact information for the employee. Such information may include, for example, an e-mail address for the employee and/or a mobile telephone number by which text messages may be sent to the employee.

The employer may cause the process step of block 704 to be performed for each of his/her employees at the time that the employer enrolls with the payroll service computer 202. The process step of block 704 may also be performed on future occasions when new employees are hired.

Figure 7B:
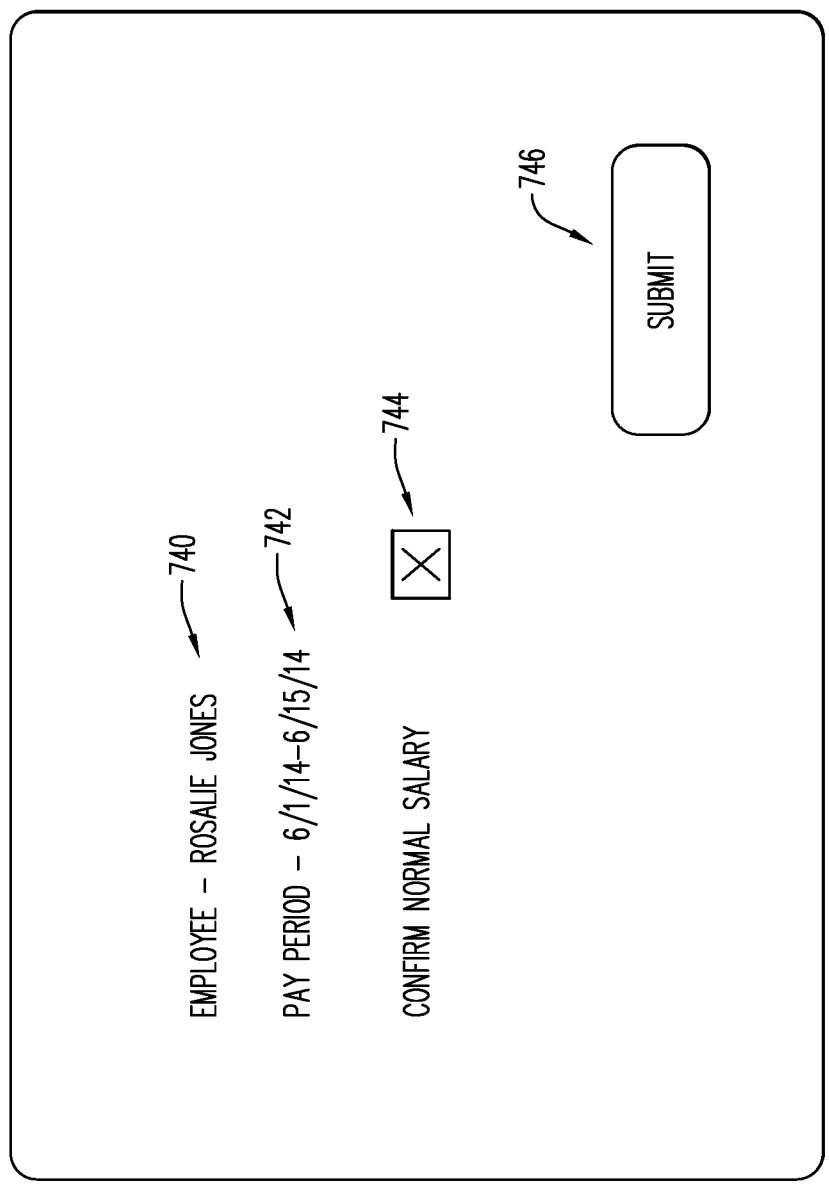
Figure 7C:
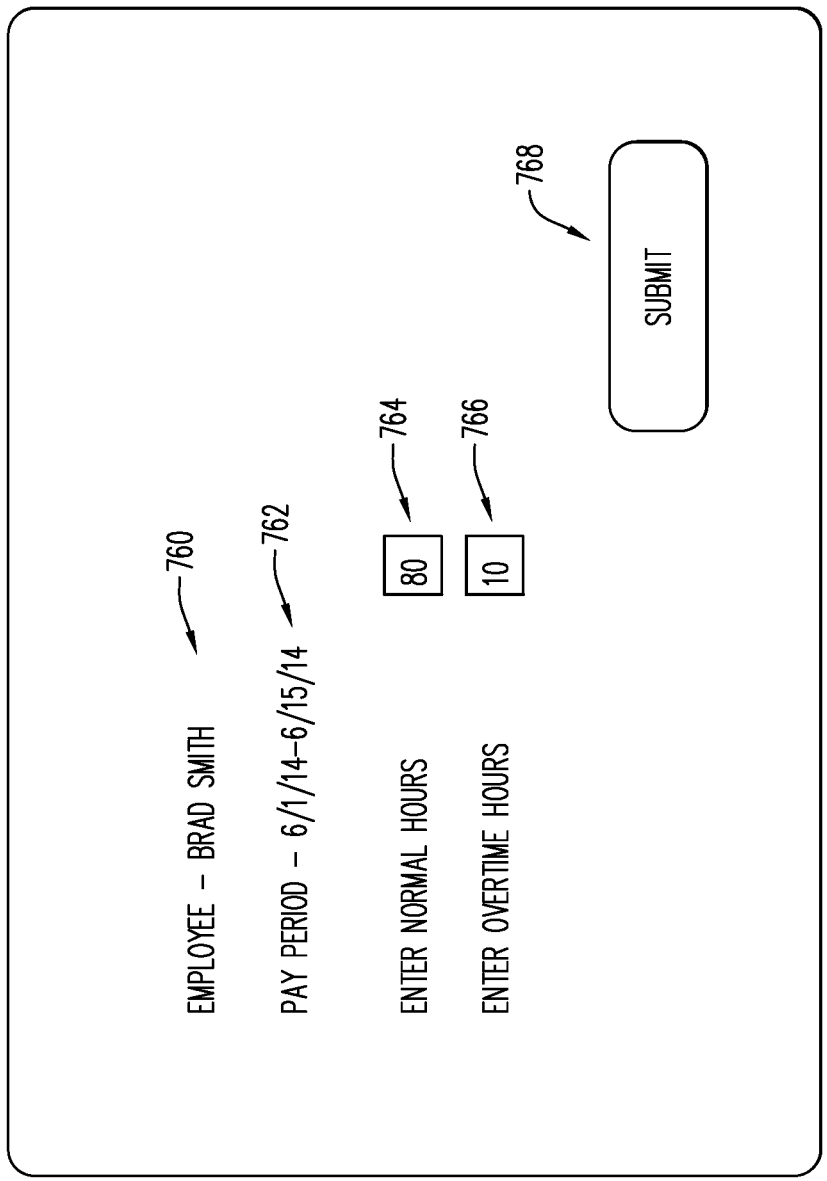

At 706 in FIG. 7, the employer may issue instructions on each payday to trigger payroll disbursements to employees by the payroll service computer 202. For this process step as well, the payroll service computer 202 may serve data entry screen displays to the employer's device 204 to facilitate entry of information by the employer in connection with instructions for payroll disbursements. FIGS. 7B and 7C show examples of such screen displays.

The screen display shown in FIG. 7B may be suitable for initiating a payroll disbursement to a salaried employee. For example, the payroll service computer 202 may serve this display screen to the employer device 204 in response to the employer selecting the employee's name from a previous screen display (not shown) which lists all of his/her employees.

In the screen display of FIG. 7B, the employee's name is shown at 740 and the current pay period is indicated at 742. The employer can operate the employer device 204 (e.g., via touchscreen) to actuate a checkbox 744 to confirm that the employee's normal salary payment for the pay period is to be disbursed. The employer can complete the instructions for the payroll disbursement for the employee by actuating the "submit" button shown at 746.

The screen display shown in FIG. 7C may be suitable for initiating a payroll disbursement to an employee who is paid on an hourly basis. The employee's name is indicated at 760. The current pay period is indicated at 762. In this example screen display, the employer has entered into data field 764 the number of hours worked by the employee that are to be paid at the normal hourly rate. In addition, the employer has entered the number of overtime hours worked at data field 766. As with the screen display of FIG. 7B, the employer can complete the instructions for the payroll disbursement for the employee identified in the screen display of FIG. 7C by actuating the "submit" button 768 shown in FIG. 7C.

Referring again to FIG. 7, in some embodiments, the employer may cause step 706 to be performed on each payday. For an employer with a small number of employees, say five to ten or fewer, the process of step 706 may take only a few minutes, so that the administrative burden of instructing the payroll service provider is minimized and the process as a whole may be very convenient from the point of view of the employer.

In some embodiments, the employer may adopt a semi-monthly pay cycle, as suggested by FIGS. 7B and 7C. Alternatively, in some embodiments, the employer may prefer a weekly pay cycle, or may have different pay cycles for different employees. The payroll disbursement system 200 may also be conveniently and flexibly arranged such that the employer has a great deal of latitude in setting pay cycles and may even be enabled to choose to pay his or her employees daily or every few days. For example, with the convenience provided by the system as disclosed herein, the employer may readily pay wages, salary and/or tips on demand in some cases. E.g., in a restaurant, in accordance with common practices, the restaurant owner may settle and distribute tips at the close of each night's shift. The employer device 204 as described herein may aid the employer in paying tips on a nightly basis via electronic messaging, and without having to pay the tips in cash.

Figure 8:
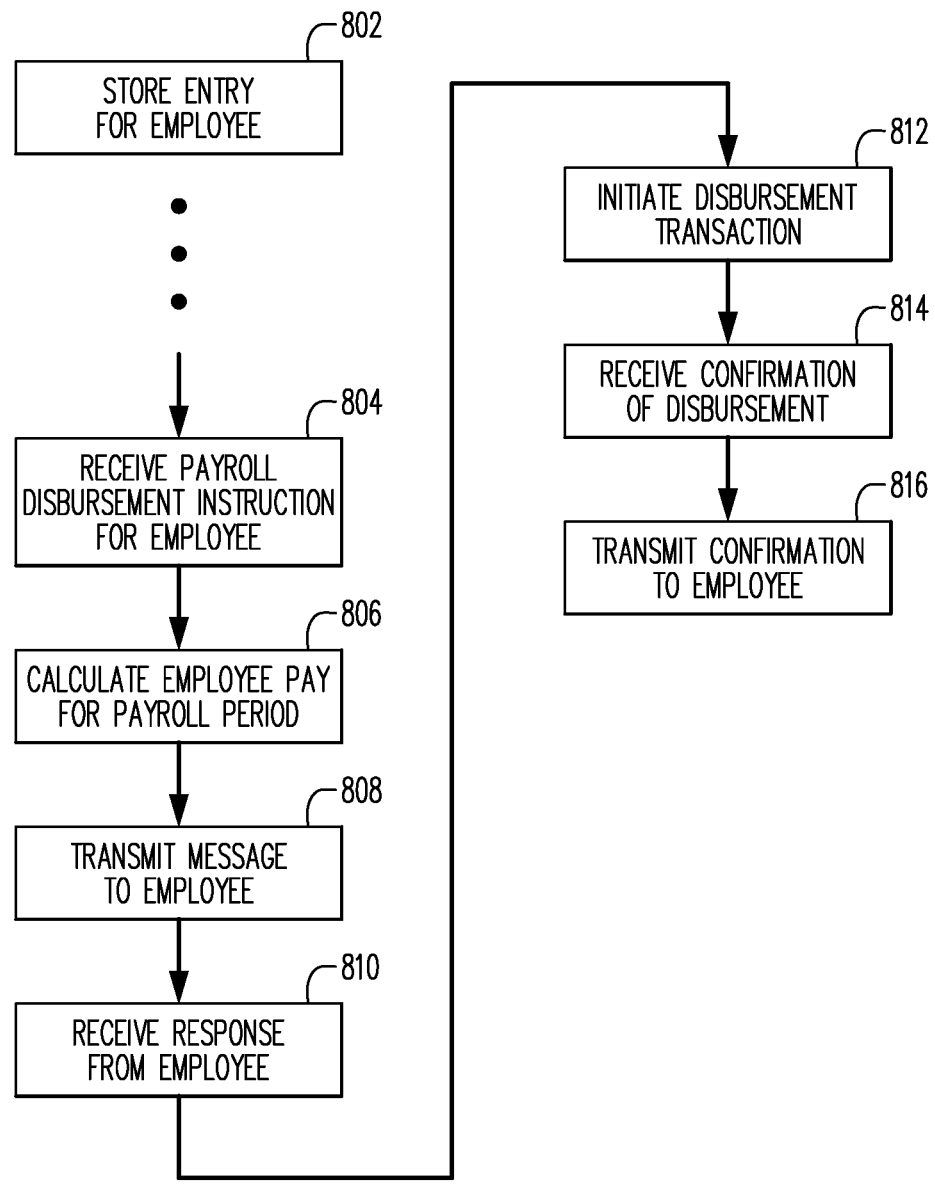
FIG. 8 is a flow chart that illustrates a process that may be performed in the computer system of FIG. 5 in accordance with aspects of the present invention.

FIG. 8 is a flow chart that illustrates a process that may be performed in the payroll service computer 202 in accordance with aspects of the present invention.

At 802 in FIG. 8, the payroll service computer 202 may store an entry for an employee in response to execution of the employee enrollment process as described above in connection with block 704 of FIG. 7. In addition, the employee may have established a user account with the payroll service computer 202 by which the employee may enter financial account information (e.g., one or more payment card account numbers and/or bank account numbers, etc.) which the payroll service computer 202 can use in disbursing pay to the employee. With the employee entry having been stored, the payroll service computer 202 is now available to receive payroll disbursement instructions from the employer for the employee. (In some embodiments, the employer may solicit the employee's financial information from the employee, and may enter such financial information into the payroll service computer 202 as part of the process of block 704 (FIG. 7).)

On a payday as designated or selected by the employer, the payroll service computer 202 may receive (block 804, FIG. 8) a payroll disbursement instruction from the employer for the employee whose data record entry was stored at 802. The submission of the payroll disbursement instruction by the employer may be in a manner as described above in connection with step 706 in FIG. 7 and also in connection with FIGS. 7B and 7C. That is, the payroll service computer 202 may serve an appropriate data entry screen display or displays to the employer device 204, and may receive the necessary information for the payroll disbursement via the employer's interaction with the screen display.

Following block 804 in FIG. 8 is block 806. At block 806, the payroll service computer 202 performs the required calculations to generate a virtual paycheck for the employee, based on the payroll disbursement information received at 804 and also based on prior set-up information (e.g., hourly pay rate or salary rate) entered at 802. The calculations of the amount of pay to be disbursed to the employee may also be based on information entered at 802 concerning applicable deductions and/or withholdings to be made from the employee's pay.

Block 808 may follow block 806 in FIG. 8. At block 808, the payroll service computer 202 may transmit a message to the employee to indicate to the employee that the payroll disbursement is available for access by the employee. This message may be, for example, an e-mail message or a text message, and may be transmitted by the payroll service computer 202 to the employee device 206 (or made available for retrieval by the employee device 206) using electronic contact information for the employee that was stored at 802. The message may contain a link or otherwise make available to the employee device 206 information such as that shown in the example screen display illustrated in FIG. 8A.

Figure 8A:
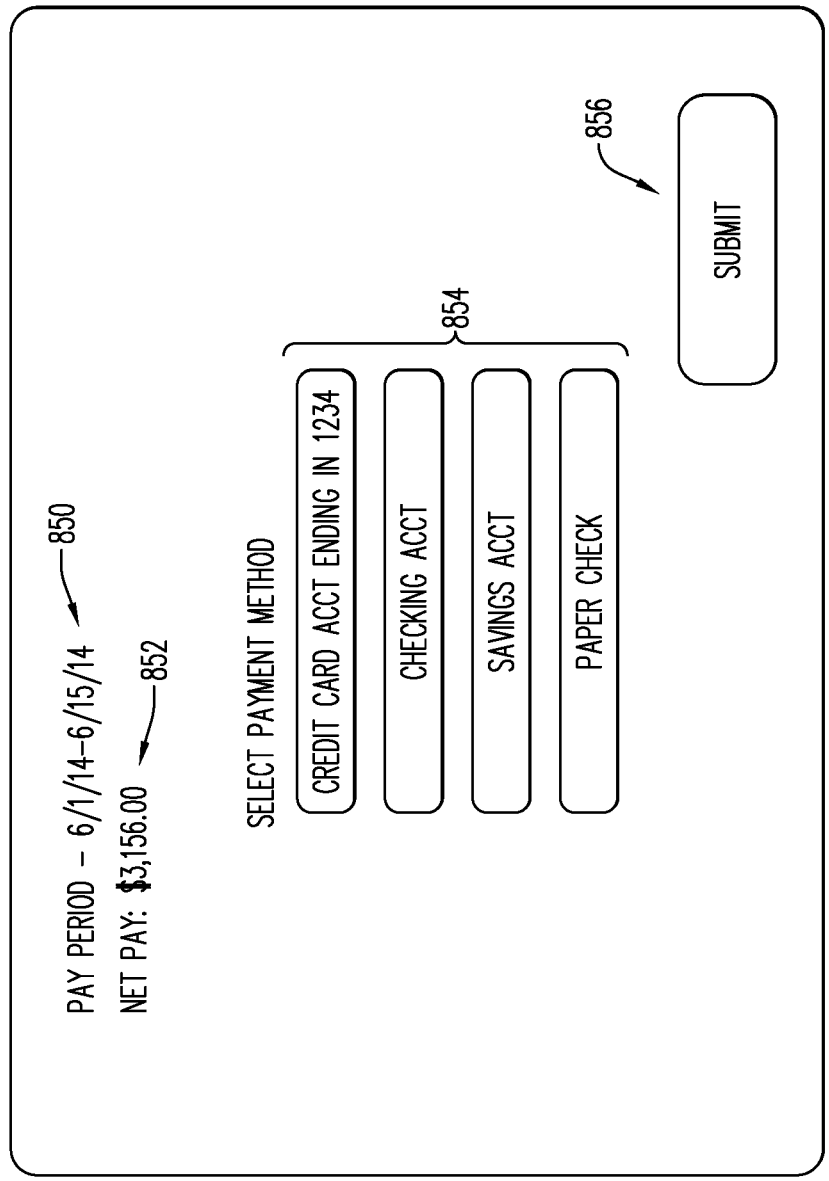
FIG. 8A is a screen display that may be presented in the system of FIGS. 2-4 in accordance with aspects of the present invention.

Referring to FIG. 8A, the message (either directly or via a link contained therein) may indicate the following to the employee: (a) current pay period (reference numeral 850); (b) the current net pay amount (reference numeral 852) now available for disbursement to the employee via the payroll service computer 202; and a set of options (reference numeral 854) from which the employee may select a manner in which the employee will receive the payroll disbursement. The disbursement options may include, for example, one or more of the employee's payment card accounts, one or more of the employee's demand deposit bank accounts, or issuance of a paper paycheck to be mailed to the employee. The employee may select one of the options shown at 854 and then actuate the "submit" button 856 in order to indicate his/her selection of one of the disbursement options. When the employee does so, a message indicating his/her selection of one of the disbursement options is transmitted or provided to the payroll service computer 202, and received by the payroll service computer 202, as indicated at 810 in FIG. 8.

Block 812 may follow block 810 in the process of FIG. 8. At block 812, the payroll service computer 202 may initiate a transaction to implement the payroll disbursement in accordance with the option selected by the employee, as indicated by the message received by the payroll service computer 202 at 810. For example, assume that the disbursement option selected by the employee was payment into a payment card account held by the employee. Assume also that the employer had designated his/her payment card account as the funding source for payroll disbursements via the payroll service computer 202. In such a case, the payroll service computer 202 may carry out the process of block 812 by directing the issuer 302 (FIG. 3) to initiate a payment card account system payment transaction via the payment network 110 to cause the payroll disbursement in the appropriate amount to be the subject of a funds transfer from the employer's payment card account to the employee's selected payment card account.

Other types of transfers and/or implementations of the payroll disbursement are possible in particular cases and/or various embodiments. For example, if the employee selected his/her demand deposit bank account as the disbursement option, then a funds transfer similar to a conventional payroll direct deposit transfer may take place. In other cases, if the employee requests mailing of a paper check, the payroll service computer 202 may issue such a check or direct the employer's bank to do so. (In some embodiments, a fee may be assessed to the employee if he/she opts for a paper paycheck.) According to some arrangements, the employer may designate one of his/her accounts that is not a payment card account as the funding source for payroll disbursements via the payroll service computer 202.

Referring again to FIG. 8, block 814 may follow block 812. At block 814, the payroll service computer 202 may receive a confirmation (e.g., from the employer's bank) that the payroll disbursement transaction has been accomplished. Then, at block 816, the payroll service computer 202 may send a message to the employee's device 206 to confirm that the payroll disbursement has occurred.

Figure 9:
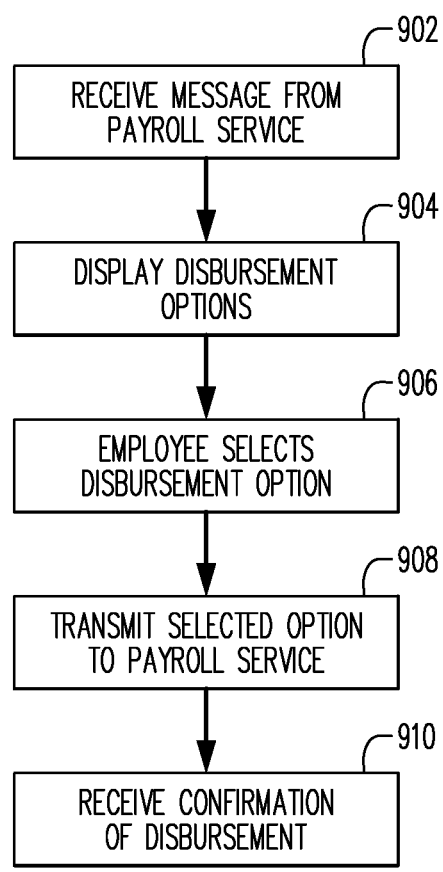
FIG. 9 is a flow chart that illustrates a process that may be performed in the employee device of FIG. 6 in accordance with aspects of the present invention.

FIG. 9 is a flow chart that illustrates a process that may be performed in the employee device 206 in accordance with aspects of the present invention. As will be seen, the process of FIG. 9 may be interrelated with the process of FIG. 8 as described above.

At 902 in FIG. 9, the employee device 206 may receive a message such as that transmitted by the payroll service computer 202 in connection with block 808 of FIG. 8. As noted before, such a message may indicate to the employee that a payroll disbursement is being made available to the employee, and that the employee has a number of options from which to select to indicate how the employee is to receive the disbursement.

At 904, the employee device 206 may display the disbursement options to the employee. This may be done via a screen display like that shown in FIG. 8A, as discussed above.

At 906 in FIG. 9, the employee may interact with the employee device 206 to make his/her selection of one of the disbursement options.

At 908, the employee device 206 may send a message or otherwise provide an indication to indicate what disbursement option the employee has selected. In some embodiments, this indication is provided via an interaction between the employee device 206 and a website hosted by the payroll service computer 202. This indication may be received by the payroll service computer 202 as the response referred to in connection with block 810 in FIG. 8. In some embodiments, the indication from the employee device to the payroll service computer 202 may alternatively take the form of a text message.

At 910 in FIG. 9, the employee device 206 may receive the confirmation message from the payroll service computer 202, as was previously referred to in connection with block 816 of FIG. 8.

With processes as described in FIGS. 8 and 9, the employee is not tied down to a particular manner of receiving his/her pay. Rather, the employee may have the flexibility to select for each payroll disbursement how he/she wishes to receive the salary or wages payment that is due.

In some embodiments, or in some cases, the employee may interact with the payroll service computer 202 to designate in advance a particular manner of disbursing his/her pay that is to be implemented for each payday by the payroll service computer 202, without engaging in steps 808 and 810 of FIG. 8. That is, the employee may elect in advance a particular mode of disbursement, so that he/she is not presented with options for disbursement at the time the disbursement is being made available. In situations where the employee has designated his/her preferred mode of payroll disbursement in advance, the process of FIG. 8 may omit the steps 808 and 810, such that the payroll service computer 202 proceeds with payroll disbursement by the employee's preferred mode directly after step 806. Moreover, in such situations, the process of FIG. 9 may be omitted, except perhaps for receipt by the employee of confirmation of disbursement.

In embodiments described above, the employee may interact with a screen display to indicate his/her selection of a payroll disbursement option. Alternatively, however, the payroll disbursement system 200 may be arranged to provide functionality such that the employee is allowed to select a payroll disbursement option via interaction with an interactive voice response (IVR) system. For example, the payroll service computer 202 may support IVR functionality for that purpose.

In some embodiments, at the same time the payroll service computer 202 generates a virtual paycheck for an employee, it may also generate an electronic paystub. The electronic paystub may be accessible by the employee via a website hosted by the payroll service computer 202.

In some embodiments, the options presented to the employee relative to payroll disbursement may include options to split the disbursement between two or more modes of disbursement. This may be done in advance, or in response to a message notifying the employee of the availability of a current payroll disbursement.

In some embodiments, the employer may be enabled to change the status of an employee (e.g., when the individual ceases to be employed by the employer). The status of the employee may thus be changed to "inactive", in which case no further payroll disbursements to the employee may be enabled, but the payroll service computer 202 may continue to maintain records concerning the employee for, e.g., accounting purposes, year-end tax reporting, etc.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" or "payment system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method of electronically disbursing an employee payment amount from an employer to an employee on a daily basis with disbursement occurring each day that the employee earns the employee payment amount, the disbursement utilizing an electronic payment network that links financial account server computers to each other, the method comprising:

storing, in a payroll disbursement computer, payroll information for the employee, the payroll information including the employee's name, address, social security number, and electronic contact information;

receiving, in the payroll disbursement computer, a payroll disbursement indication from the employer, the payroll disbursement indication authorizing disbursement of the employee payment amount to the employee, the indication including a first electronic message originating from a first hand-held mobile device operated by the employer, the first electronic message received in the payroll disbursement computer on a day in which said employee payment amount was earned by the employee, the first hand-held mobile device including a first processor, a first memory, first communication circuitry and a first touchscreen for providing a first user interface to the employer;

in response to the payroll disbursement indication, sending a second electronic message from the payroll disbursement computer to a second hand-held mobile device operated by the employee, the message addressed according to the stored electronic contact information for the employee, the message indicating to the employee (i) that the disbursement of the employee payment amount is available; and (ii) that the employee has a plurality of options for receiving the disbursement of the employee payment amount, the second electronic message sent on the day the employee payment amount was earned, the second hand-held device including a second processor, a second memory, second communication circuitry and a second touchscreen for providing a second user interface to the employee;

receiving, in the payroll disbursement computer, response information from the employee, the response information indicative of the employee's selection of one of the plurality of options, the response information received by the payroll disbursement computer as electronic messaging from the second hand-held mobile device, the response information indicating that the the employee payment amount is to be transferred via the electronic payment network to a destination financial account owned by the employee; and initiating, by the payroll disbursement computer, a transfer of funds from an origination financial account owned by the employer to the destination financial account owned by the employee, wherein the funds transfer is initiated in response to the payroll disbursement computer receiving the response information from the second hand-held mobile device, the funds transfer implemented by electronic messaging via the electronic payment network from a first one of said financial account server computers that stores said origination financial account to a second one of said financial account server computers that stores said destination financial account;

said funds transfer occurring on the day the employee payment amount was earned;

and wherein the payroll disbursement computer includes a third processor and a third memory in communication with the third processor; said third memory storing program instructions for programming the third processor to perform said steps of (i) storing payroll information, (ii) receiving the payroll disbursement indication, (iii) sending the second electronic message; (iv) receiving response information, and (v) initiating the transfer of funds.

* * * * *